United States Patent [19]

Bass et al.

[11] Patent Number: 5,086,354
[45] Date of Patent: Feb. 4, 1992

[54] THREE DIMENSIONAL OPTICAL VIEWING SYSTEM

[76] Inventors: Robert E. Bass; John S. Bass, both of 2832 NE. 35th St., Ft. Lauderdale, Fla. 33306

[21] Appl. No.: 316,019

[22] Filed: Feb. 27, 1989

[51] Int. Cl.⁵ ............................................. G02B 27/22
[52] U.S. Cl. ..................................... 359/465; 359/462
[58] Field of Search ............... 350/130, 132; 358/88, 358/91

[56] References Cited

U.S. PATENT DOCUMENTS

| | | | |
|---|---|---|---|
| 2,693,128 | 11/1954 | Dewhurst | 350/137 |
| 2,736,250 | 2/1956 | Papritz | 354/117 |
| 3,399,993 | 9/1968 | Agnew | 354/117 |
| 3,695,878 | 10/1972 | Salyer et al. | 354/117 |
| 4,178,090 | 12/1979 | Marks et al. | 354/117 |
| 4,190,856 | 2/1980 | Ricks | 358/88 |
| 4,295,153 | 10/1981 | Gibson | 350/132 X |
| 4,437,745 | 3/1984 | Hajnal | 354/117 |
| 4,480,893 | 11/1984 | Fantone | 350/132 |
| 4,487,490 | 12/1984 | McKee | 354/115 |
| 4,552,442 | 11/1985 | Street | 354/115 |
| 4,559,556 | 12/1985 | Wilkins | 350/132 X |
| 4,647,966 | 3/1987 | Phillips et al. | 358/88 |
| 4,687,310 | 8/1987 | Cuvillier | 354/115 |
| 4,695,130 | 3/1987 | Medina et al. | 350/132 |
| 4,740,836 | 4/1988 | Craig | 350/132 X |

OTHER PUBLICATIONS

Kodak Datashow HR/M Projection Pad, copyrighted 1988.
PC Viewer by In Focus Systems Inc.
Mac View Frame by nView.
Mac Data Display by Computer Accessories Corp., 6/17/88.

Primary Examiner—Scott J. Sugarman
Attorney, Agent, or Firm—Eckert Seamans Cherin & Mellott

[57] ABSTRACT

In one embodiment, the optical viewing system produces a simulated, three dimensional image utilizing two video monitors and a half silvered mirror. The two dimensional image produced by one monitor is transmitted through the half silvered mirror while the second image from the second monitor is reflected from the half silvered mirror and overlaid onto the image of the first monitor. Since the screens of the monitors are located at different distances from the initial point of overlay of the two images, the images appear to the observer, in the optical viewing path, to be three dimensional.

12 Claims, 3 Drawing Sheets

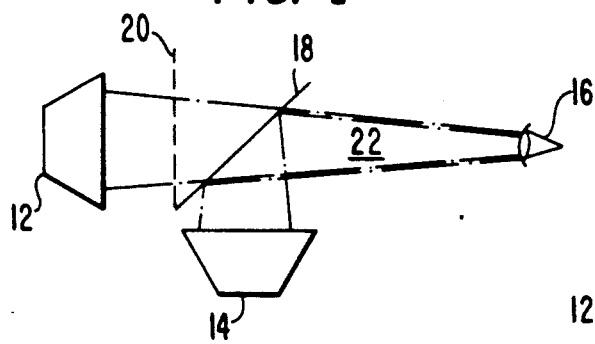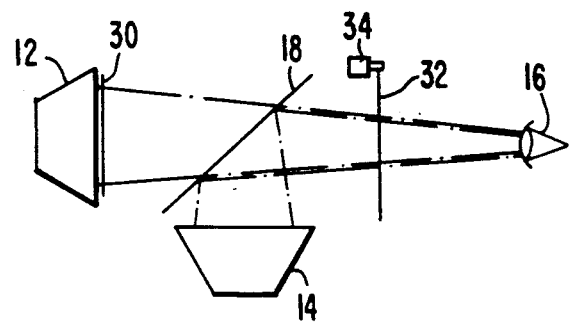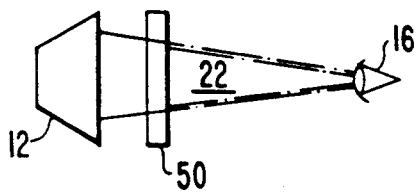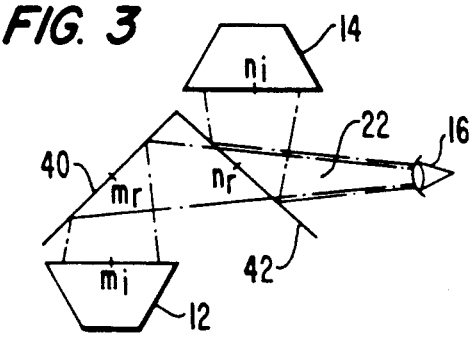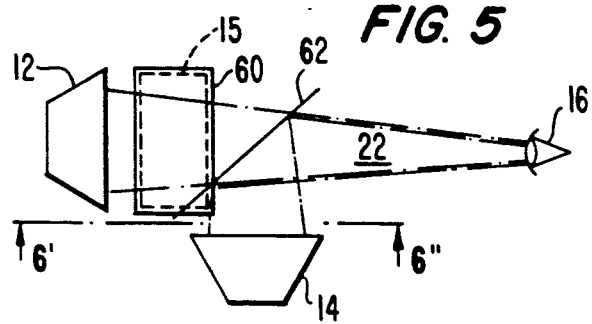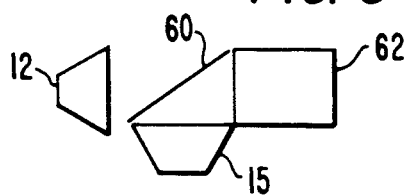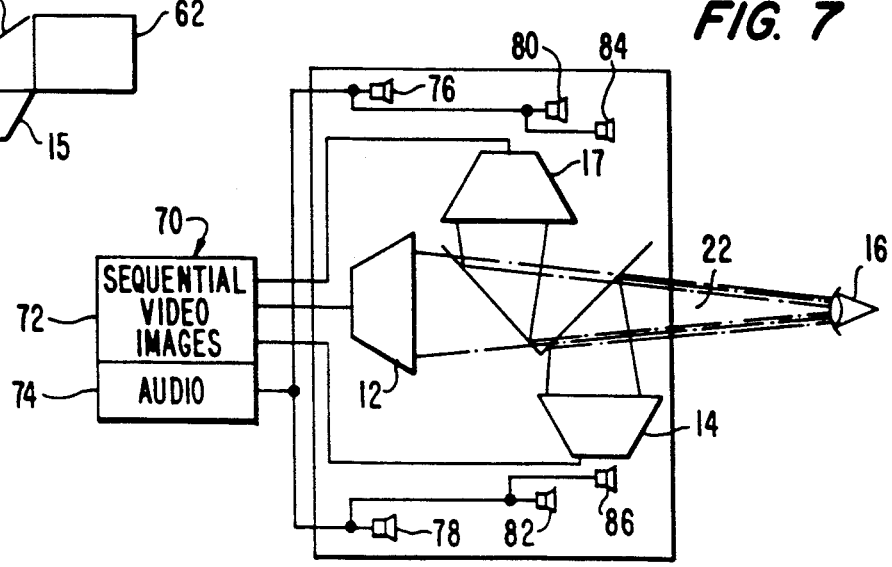

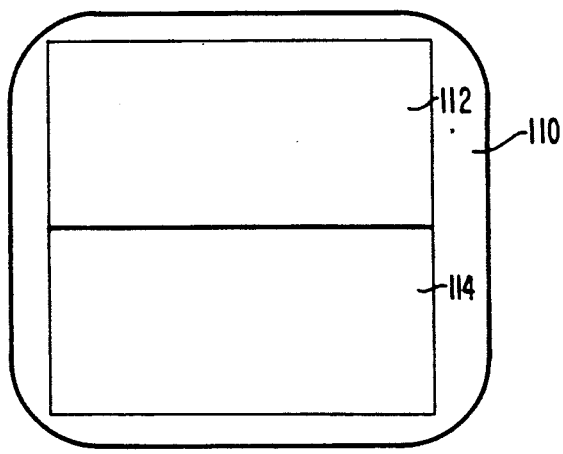
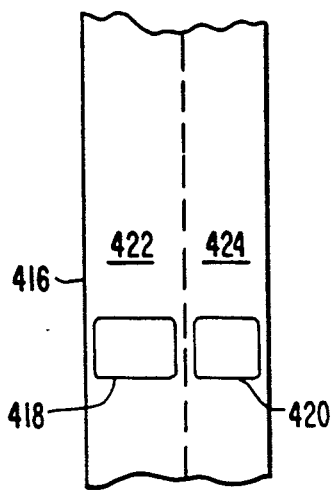
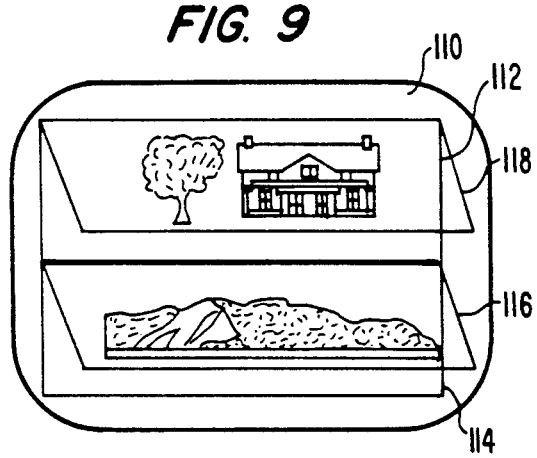
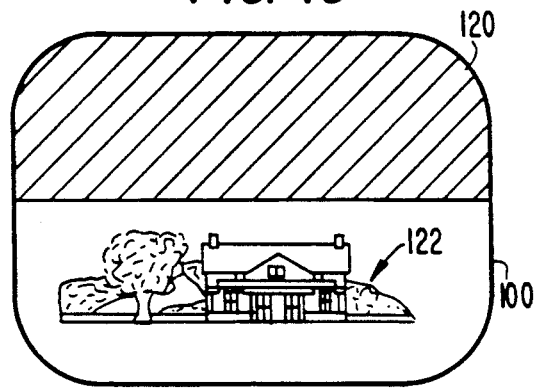
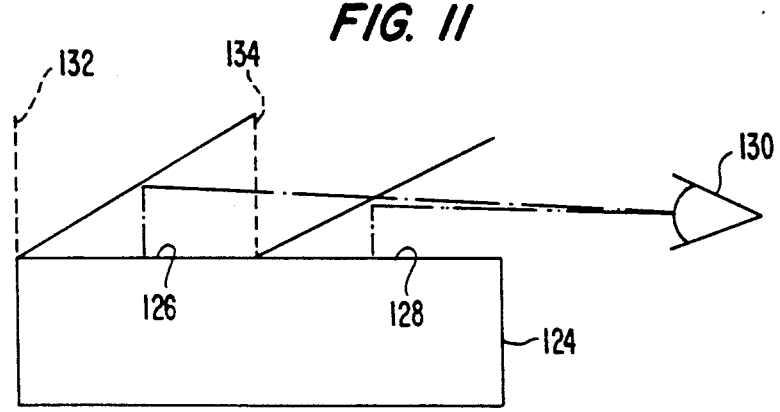

THREE DIMENSIONAL OPTICAL VIEWING SYSTEM

BACKGROUND OF THE INVENTION

The present invention relates to an optical viewing system that produces a simulated three dimensional image which ca be viewed by individuals.

In the past, three dimensional imagery has been simulated by having the individual view a specially processed or configured two dimensional image through special eyeglasses. For example, the processed two dimensional image may have image portions emitting a first type of polarized light and other portions emitting a second type of polarized light. The eyeglasses worn by the observer optically process the two dimensional image by blocking or inhibiting the passage of one type polarized light and transmitting the other type of light. The eyes of the viewer essentially receive different images and the brain interprets those different images as having three dimensional characteristics. Various other optical systems for producing three dimensional images are known, such as systems using lenticular lenses and films. For example, see U.S. Pat. Nos. 4,487,490; 4,552,442; and 3,695,878.

OBJECTS OF THE INVENTION

It is an object of the present invention to provide an optical viewing system that produces a simulated, three dimensional image from two, two dimensional images.

It is another object of the present invention to provide an optical viewing system which can display conventional two dimensional images or, alternatively, simulated three dimensional images.

It is another object of the present invention to provide an optical viewing system which produces special visual effects by reversing the foreground and background images.

It is an additional object of the present invention to provide an optical viewing system wherein the foreground image can be electronically processed distinct from the background image thereby enabling dynamic change of the foreground with respect to the background.

It is another object of the present invention to be able to intermix images projected from different sources, e.g., overlaying an image from a video monitor with an image from a computer monitor.

It is a further object of the present invention to provide a simulated and sequential, three dimensional image with multiple two dimensional image projectors and multiple audio sources whereby a three dimensional image appears to change its relative location with respect to the background image and the audio signals track the relative change of the foreground images.

It is another object of the present invention to utilize a transparent liquid crystal display (herein LCD) screen to produce the foreground image.

It is an additional object of the present invention to provide an optical viewing system which displays randomly generated optical effects in simulated 3D.

SUMMARY OF THE INVENTION

In one embodiment, the optical viewing system produces a simulated, three dimensional image utilizing two video monitors and a half silvered mirror. The two dimensional image produced by one monitor is transmitted through the half silvered mirror while the second image from the second monitor is reflected from the half silvered mirror and overlaid onto the image of the first monitor. Since the screens of the monitors are located at different distances from the initial point of overlay of the two images, the images appear to the observer, in the optical viewing path, to be three dimensional.

BRIEF DESCRIPTION OF THE DRAWINGS

Further objects and advantages of the present invention can be found in the detailed description of the preferred embodiments when taken in conjunction with the accompanying drawings in which:

FIG. 1 schematically illustrates one embodiment of the optical viewing system utilizing two image projectors;

FIG. 2 schematically illustrates an embodiment of the optical viewing system including a mechanism which diminishes or enhances the background image with respect to the foreground image;

FIG. 3 schematically illustrates another embodiment of the optical viewing system wherein both image projectors are disposed at right angles with respect to the optical viewing path;

FIG. 4 illustrates another embodiment of the present invention wherein the foreground image is produced by a transparent LCD screen;

FIG. 5 illustrates a top view further embodiment of the present invention utilizing a plurality of image projectors and an optical processor system which overlays the two dimensional images from all the projectors;

FIG. 6 schematically illustrates a side view of the embodiment of the optical viewing system from the perspective of section line 6'-6" in FIG. 5;

FIG. 7 schematically illustrates an optical viewing system having a plurality of image projectors and a plurality of audio sources;

FIGS. 8, 9, 10 and 11 schematically illustrate the use of a single monitor having a split screen as other embodiments of the optical viewing system;

FIG. 15 illustrates dual track video tape carrying the aforementioned image signals.

DETAILED DESCRIPTION OF THE PREFERRED EMBODIMENTS

Figure 14:
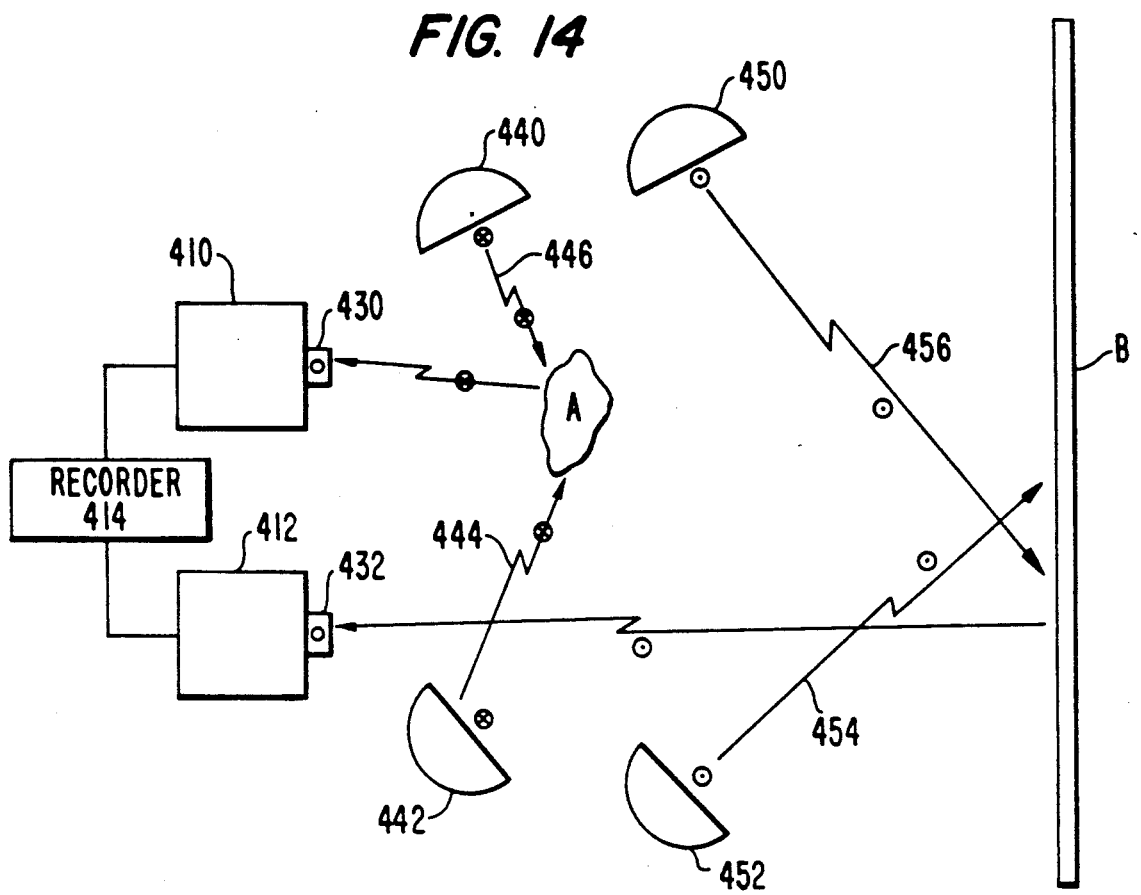
FIG. 14 schematically illustrates a system for producing a pair of two dimensional image signals that, when combined, can simulate three dimensional images.

The present invention relates to an optical viewing system for producing a simulated, three dimensional image.

The basic principle behind the present invention is that a three dimensional image is simulated by projecting two, two dimensional images towards an individual when the virtual image of one of the two, two dimensional images and the actual or virtual image of the other are at different distances from the observer. The foreground image has portions which are light transmissive such that when overlaid over the background image, the background image is transmitted through those portions.

FIG. 1 schematically illustrates one embodiment of the invention. Means for producing the two, two dimensional images includes, in this embodiment, video monitor 12 and video monitor 14. Both monitors have screens from which the image is projected. Monitors 12 and 14 ar image projectors that project two dimensional images to an observation point or observer 16 over an optical viewing path 22. The two dimensional image projected by monitor 12 is transmitted through an optical processor, in this embodiment half silvered mirror 18, to observer 16. The two dimensional image from video monitor 14 is reflected 90° by half silvered mirror 18 and is directed to observer 16. Due to the positioning of the optical processor/mirror 18, the image from monitor 14 is overlaid upon the image from monitor 12 and placed in viewing path 22. Observer 16 sees the image from monitor 14 at virtual plane 20 that is closer to the observer than the image produced by monitor 12. Therefore, monitor 14 produces a foreground image and monitor 12 produces a background image. Since the images are spaced apart, the observer sees a simulated, three dimensional image. In the embodiment of FIG. 1, as long as the virtual image at plane 20 is spaced apart from the image produced by monitor 12, a three dimensional effect will be seen by observer 16.

The means for producing the two dimensional images can include television receivers, a video monitor that is supplied with a foreground image in one instance and a background image in another instance, or two pictures that are optically processed such that the images projected by the pictures or the light rays reflected off the pictures are overlaid upon each other and projected along an optical viewing path 22 towards observer 16. The two dimensional images may be images projected from, for example, a big screen or projected screen television systems, motion picture screens or other image projectors. The system can display images from different sources. For example, the real image, as viewed as reflected or emitted light from an object, could be optically processed and overlaid upon an image from a television monitor. In addition, the image source signal, obtained from a computer, could be overlaid onto an image source generated by a VCR.

The optical processor can be one or more half silvered mirrors, specially configured prisms or optical combiners which are suitably positioned.

FIG. 2 schematically illustrates a system similar to that shown in FIG. 1. However, the system further includes a polarizer 30, disposed between monitor 12 and optical processor/half silvered mirror 18, and a second polarizer 32 disposed downstream from polarizer 30. Second polarizer 32 is rotated about its optical axis by a motor or other device 34 such that the relative angle, between the angle of polarization of polarizer 30 and the angle of polarization of the second polarizer 32, changes dependent upon the position of polarizer 32. In other words, polarizer 30 has a known angle of polarization such that light transmitted through polarizer 30 has a known angle of polarization. Polarizer 32 also has a known angle of polarization and alters light that passes through it such that the light contains only that angle of polarization. Assuming the angle of polarization of polarizer 30 is aligned with a reference axis, i.e., is set at 0°, and assuming that the relative angle between the axis of polarization of polarizer 32 is 15° with respect to the reference axis, the relative angle between the first and second polarizer is 15°. By rotating polarizer 32 such that the relative angle is reduced to 0°, light that is transmitted through polarizer 30 would be similarly transmitted through polarizer 32 without change. However, if the relative angle between polarizer 30 and polarizer 32 is changed to 90°, no light would be transmitted through the second polarizer 32 due to the crossed angles of polarization between the two polarizers. Monitor 12 provides a background, two dimensional image. By rotating polarizer 32 about its optical axis, the visual intensity of the background image is enhanced or diminished based upon the relative angle between the polarizers. Therefore, the three dimensional effect simulated by the system is changed based upon the intensity of the background image. Another embodiment of the invention can be constructed by placing polarizer 30 in front of monitor 14. Alternatively, the second polarizer 32 could be moved to a position intermediate polarizer 30 and optical processor 18.

FIG. 3 schematically illustrates a system wherein image projectors 12 and 14 are at right angles with respect to optical viewing path 22. The optical processor in this embodiment includes half silvered mirror 40 and half silvered mirror 42. The relative angle between mirrors 40 and 42 is 90°. To optically align image projectors or monitors 12 and 14 with respect to optical viewing path 22, imagery lines intersecting mid points $m_l$ and $m_r$ and $n_l$ and $n_r$ of the monitors and mirrors are aligned to form a series of perpendicular lines with respect to a center line within optical viewing path 22. This alignment insures that the foreground and background images are accurately overlaid into path 22.

FIG. 4 schematically illustrates another embodiment of the present invention wherein an LCD screen 50 is part of the image producing system and the optical processor. FIG. 4 shows an image projector, such as video monitor 12, which produces one two dimensional image. That image is projected through a transparent LCD screen 50. As used herein the term "transparent LCD screen" is a LCD screen that when activated, is generally transparent to light. When an image signal is supplied to the LCD screen, those portions darken and, hence, create the foreground image. Such an LCD screen is commercially available from In Focus Systems, Inc. of Tualatin, Oreg. as Model No. PZV6448C+2. Kodak produces a Kodak Datashow HR/M Projection Pad that is also similar to the "transparent LCD screen" described herein. Other transparent LCD screens are available from other manufacturers. The transparent LCD screen 50 is the second image projector because when the LCD screen is activated and an image control signal is applied to the LCD, an image is generated by the screen and the remaining portions of the screen remain transparent. The LCD screen is part of the optical processor since the screen is transparent to light and permits light and images generated and projected by monitor 12 to pass therethrough. Therefore, LCD screen 50 combines the background image, produced by monitor 12, and the foreground image, produced by screen 50, and projects the resultant simulated three dimensional image into optical viewing path 22. The image produced by LCD screen 50 can be electronically processed. Therefore, the foreground image can be changed with respect to the size of the background image to create special video effects. Also, the image from the LCD screen can be processed to conform to the size of the background screen.

FIG. 5 illustrates a plurality of two dimensional image projectors and particularly schematically illustrates video monitors 12, 14 and 15. This viewing system includes two half silvered mirrors 60 and 62 as part of the optical processor that overlays the two dimensional images produced and projected, respectively, by monitors 12, 15 and 14. The screen on monitor 15 is generally parallel with the plane of the drawing. FIG. 6 schematically illustrates a side view of the system shown in FIG. 5. As shown in FIG. 6, the intermediate image produced by video monitor 15 is projected upwards toward half silvered mirror 60 which then reflects the image horizontally toward observer 16. Returning to FIG. 5, the image projected by video monitor 12 is transmitted through mirrors 60 and 62 into optical viewing path 22. The image projected by video monitor 14 is reflected by half silvered mirror 62 and is directed horizontally to observer 16 in optical viewing path 22. Therefore, monitor 12 provides a background image, monitor 15 provides an intermediate image and monitor 14 provides a foreground image. Initially the intermediate image from monitor 15 is overlaid upon the background image from monitor 12 and then the foreground image from monitor 14 is overlaid upon the resulting composite image. Thus, a triple image is projected to observer 16 in optical viewing path 22. The principles of the present invention can be utilized with a plurality of monitors such that 4, 5, 6, etc. images can be overlaid and projected into a single optical viewing path toward observer 16. The simulated, three dimensional image effect is achieved as long as the virtual images from each monitor are at different distances with respect to the observer.

FIG. 7 schematically illustrates a visual system combined with an audio system. Video and audio signal generator 70 includes a sequential video image generator 72 and an audio generator 74. The audio generator is coupled to a plurality of speakers, one of which is speaker 76. The visual images developed by video generator 72 may be linked, associated or coordinated with the audio signals produced by audio generator 74. For example, if a person were viewed as walking toward observer 16 by progressively and sequentially showing the person visually advancing from background monitor 12 to intermediate monitor 17 and then to foreground monitor 14, sound representing the person's footsteps could be initially generated by rearly disposed speakers 76, 78, then sequentially by intermediate speakers 80, 82 and finally by foreground speakers 84, 86. The multiple source audio system is associated with the sequentially presented two dimensional images that are combined and overlaid into optical viewing path 22. The audio signals are fed in coordination with the sequential video signals.

FIGS. 8, 9, 10 and 11 illustrate the use of a single image projector that has a split screen such that the projector produces two, two dimensional images. FIG. 8 schematically shows an image display area 110 that can be the screen of a single video monitor. That image display area is divided into screen areas 112 and 114. If area 110 is the screen of a video monitor, the signals projected onto area 110 are separated to form two distinct screens 112 and 114.

FIG. 9 schematically illustrates the placement of the optical processor, that includes half silvered mirror 116 and fully reflective mirror 118, over area 110. The foreground image of the house and tree on upper screen 112 is reflected and is directed at a 90° angle vertically downward by fully reflective mirror 118. The image of the house and tree is again reflected at a 90° by half silvered mirror 116 and is simultaneously overlaid upon the background image of the mountain projected from lower screen 114. FIG. 10 is a view of monitor 100 as seen by the observer. A plate 120 blocks the view of upper screen 112 and mirror 118 that is part of the optical processor. The initial images from screens 112 and 114 and the composite image, generally designated by 122, illustrate that the foreground image initially developed by upper screen 112 need not be inverted from top to bottom or from left to right because the foreground house and tree scene is twice reflected. Care must be taken in optically processing the images in the embodiment shown in FIG. 9. To the observer, the optical distances must be different to achieve a 3D effect. This may be accomplished by moving the optical processor, mirrors 118 and 116 away from the screen surfaces.

FIG. 11 illustrates another embodiment wherein video monitor 124 produces a background image on screen portion 126 and a foreground image on screen portion 128. The background image is seen by observer 130 at virtual plane 132, whereas the foreground image is seen at virtual plane 134. Since both images in this embodiment are reflected once, both images must be electronically or optically processed such that the initial images from screens 126 and 128 are vertically inverted and are inverted from left to right.

Figure 12:
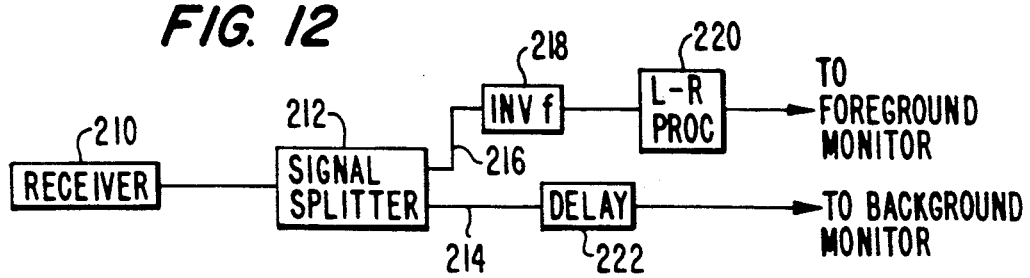
FIG. 12 illustrates, in block diagram form, an electronic processing system for the optical viewing system.

FIG. 12 illustrates, in block diagram form, an electronic circuit that processes these image signals. Receiver 210 essentially receives two television signals. Signal splitter 212 separates those signals and produces a background image signal on line 214 and a foreground image signal on line 216. Inverter circuit 218 can be used to invert the signal from top to bottom; left to right perspectives can be reversed by l-r processor/inverter 220. The resultant signal is applied to the foreground monitor. This circuit could be utilized with the optical system shown in FIG. 1 since the foreground image is inverted and left to right reversed by the optical processor. With respect to the background image signal, this signal must be time keyed to the foreground signal and hence delay circuit 222 is utilized. Dependent upon the convention adopted by the television broadcast stations, left to right inverter 220 could be eliminated in one optical viewing system given the particular configuration of the optical processors and the positioning of the video monitors in that system. In other configurations, both top to bottom inverter 218 and left to right processor 220 would be utilized to achieve the proper viewing characteristics. Otherwise, the image from one or more of the image projectors could be optically processed such that the proper view is presented for the observer. FIG. 11 requires both the foreground and background images to be processed in an inverted and left to right sense.

The optical viewing system in the embodiments described above could be further used with conventional, two dimensional televisions signals now commonly broadcast. Simply by disabling a portion of the screen or one of the monitors (contrast the embodiment in FIG. 11 to the embodiment in FIG. 1), the observer could continue to view conventional, two dimensional images rather than the simulated, three dimensional images. Also, the optical viewing system of the present invention can be used to generate special effects whereby the background and foreground images are reversed. In the example shown in FIGS. 9 and 10, the special effect would result in the mountain scene being placed over the house scene. This would result in an "impossible" image.

Figure 13:
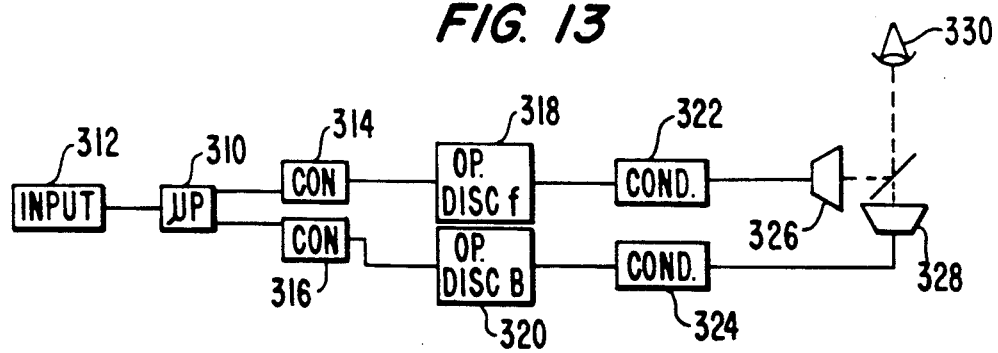
FIG. 13 illustrates, in block diagram form, an electronic processing system for another embodiment of the optical viewing system.

FIG. 13 illustrates the use of a computer or microprocessor 310 to generate dissimilar foreground and background images. Computer or microprocessor 310 (which includes a memory and other associated devices) is controlled by an input device 312. Microprocessor 310 commands controllers 314, 316 to generate control signals to select certain images from the foreground optical disc 318 and the background optical disc 320, respectively. The signals generated by the two optical discs are applied to conditioning circuits 322 and 324 and ultimately applied to monitors 326 and 328. Observer 330 would then be able to control the foreground and background visual scenes by changing input 312. The computer/microprocessor could be programmed to randomly select image signals which would result in randomly generated optical effects. Otherwise, the use of this optical viewing system is capable of eliminating the "blackout" or video blanking when the video laser disc is being initially accessed. During the accessing period, the other laser disc/display monitor would produce an image that is displayed on the corresponding monitor in the three dimensional system. In other words, one screen is always active.

FIG. 14 illustrates a system for producing two dimensional image signals that can simulate three dimensional images. The system includes two cameras 410 and 412. The outputs of cameras 410 and 412 are coupled to recorder 414 that records the scenes on a dual track video tape 416 shown in FIG. 15. FIG. 15 shows record heads 418 and 420 disposed above tracks 422 and 424, respectively. One head records the foreground image signals and the other head records the background signals. Returning to FIG. 14, cameras 410 and 412 and video recorder 414 comprise two video recorders; one recorder for each scene, since the cameras are instrumental in recording the visual scenes. One of the advantages of the system illustrated in FIGS. 14 and 15 is that the images (and audio) are automatically time synchronized.

At the image input of camera 410 is a polarized screen. The polarized screen has an angle of polarization. The screen is set at a first predetermined relative angle of polarization that is shown by the "X" at input 430 of camera 410. In contrast, at input 432 of camera 412, a second polarized screen is utilized. The second polarized screen is set at a second predetermined relative angle of polarization that is shown by a "dot in a circle".

The system further includes a first lighting system including lights 440 and 442. This first lighting system generates light having an angle of polarization equivalent to the first relative angle of polarization set by the polarized screen at input 430 of camera 410. Scene A is illuminated by lights 440 and 442 and since the angle of polarization of the lights, shown by rays 444 and 446, is the equivalent to that of input of 430, camera 410 records scene A.

A second lighting system including lights 450 and 452 that generate light having an angle of polarization equivalent to the second relative angle of polarization set at input 432 of camera 412. Light rays 454 and 456 illuminate background scene B and since the angle of polarization is equivalent to the angle at input 432 of camera 412, background scene B is captured by that camera. This system of producing two, two dimensional image signals can be used to simulate three dimensional images in the aforementioned optical viewing systems. The recording system may be more effective if the relative angle between the angles of polarization is 90°. That is, the angles of polarization at camera inputs 430 and 432 are crossed. In that case, none of the background scene B would be picked up by camera 410 and none of the foreground scene A would be picked up by camera 412.

In the optical viewing system and the recording system, the foreground image must be specially processed such that when that image is projected towards the observer, the background image is only blocked by the relevant portions of the foreground. To display a person in the foreground, the person may be photographed against a black background. The "black background" in the foreground image results in light transmissive regions in the image, thereby permitting the background image to be projected towards the observer.

The claims appended hereto are meant to cover modifications and changes within the spirit and scope of the present invention.

What is claimed is:

1. An optical viewing system for producing a simulated three dimensional image comprising:
   first means for generating and displaying a two dimensional image on a display means;
   second means for generating and displaying a two dimensional image on a transparent display means;
   wherein each of said display means are located at different, predetermined locations on an optical viewing path and further wherein the image displayed by said first means for displaying is projected through said second means for displaying.

2. An optical viewing system as claimed in claim 1 wherein said first means for generating and displaying comprises a video monitor.

3. An optical viewing system as claimed in claim 1 including an associated, multiple source audio system, said multiple audio sources being spaced apart and fed audio signals in coordination with sequential two dimensional images produced by said first and second means for generating and displaying.

4. An optical viewing system as claimed in claim 1 wherein said first means for generating and displaying includes an image projector and said second means for generating and displaying includes a liquid crystal display spaced apart therefrom, said liquid crystal display being light transparent such that the image produced by said image projector is projected through said liquid crystal display in an optical viewing path.

5. An optical viewing system as claimed in claim 4 wherein the image produced by the image projector is directed by a further means for generating and displaying through said liquid crystal display.

6. A system for recording two, two dimensional image signals for use with a three dimensional viewing system, comprising:
   at least two video recorders for recording two, two dimensional image signals, one recorder coupled to the output of a camera having a polarized screen at its image input set at a first predetermined relative angle of polarization, the other recorder coupled to the output of a camera having another polarized screen at its image input set at a second predetermined relative angle of polarization;
   a first lighting system producing light at said first relative angle of polarization and illuminating a first scene to be recorded;

a second lighting system producing light at said second relative angle of polarization and illuminating a second scene to be recorded;

wherein said first and second scenes are displaced with respect to each other.

7. A system as claimed in claim 6 wherein said video recorders produce image signals that are simultaneously stored on a dual track video tape.

8. A system for displaying a three dimensional image to a viewer, said system comprising:

first display means for generating and displaying a background image;

second display means positioned in an optical viewing path between said first display means and said viewer, said second display means for generating and displaying a foreground image, wherein said background image is projected through said foreground image.

9. The system of claim 8 further including additional transparent display means disposed between said first and second display means, said additional transparent display means for generating displaying images positioned between said foreground and background images.

10. The system of claim 8 wherein said first display means is a cathode-ray tube.

11. The system of claim 8 wherein said first display means is a liquid crystal display.

12. An improved optical viewing system for continuously displaying an image to a viewer, said system comprising:

first means for generating and displaying a two dimensional image on a display means, said display means coupled to a first source of video;

second means for generating and displaying a two dimensional image on a transparent display means, said transparent display means coupled to a second source of video;

wherein the images displayed by said first means for displaying are projected through said second means for displaying and further wherein said first and second sources of video are activated alternately so that an image is continuously displayed to said viewer.

* * * * *